Patented June 1, 1926.

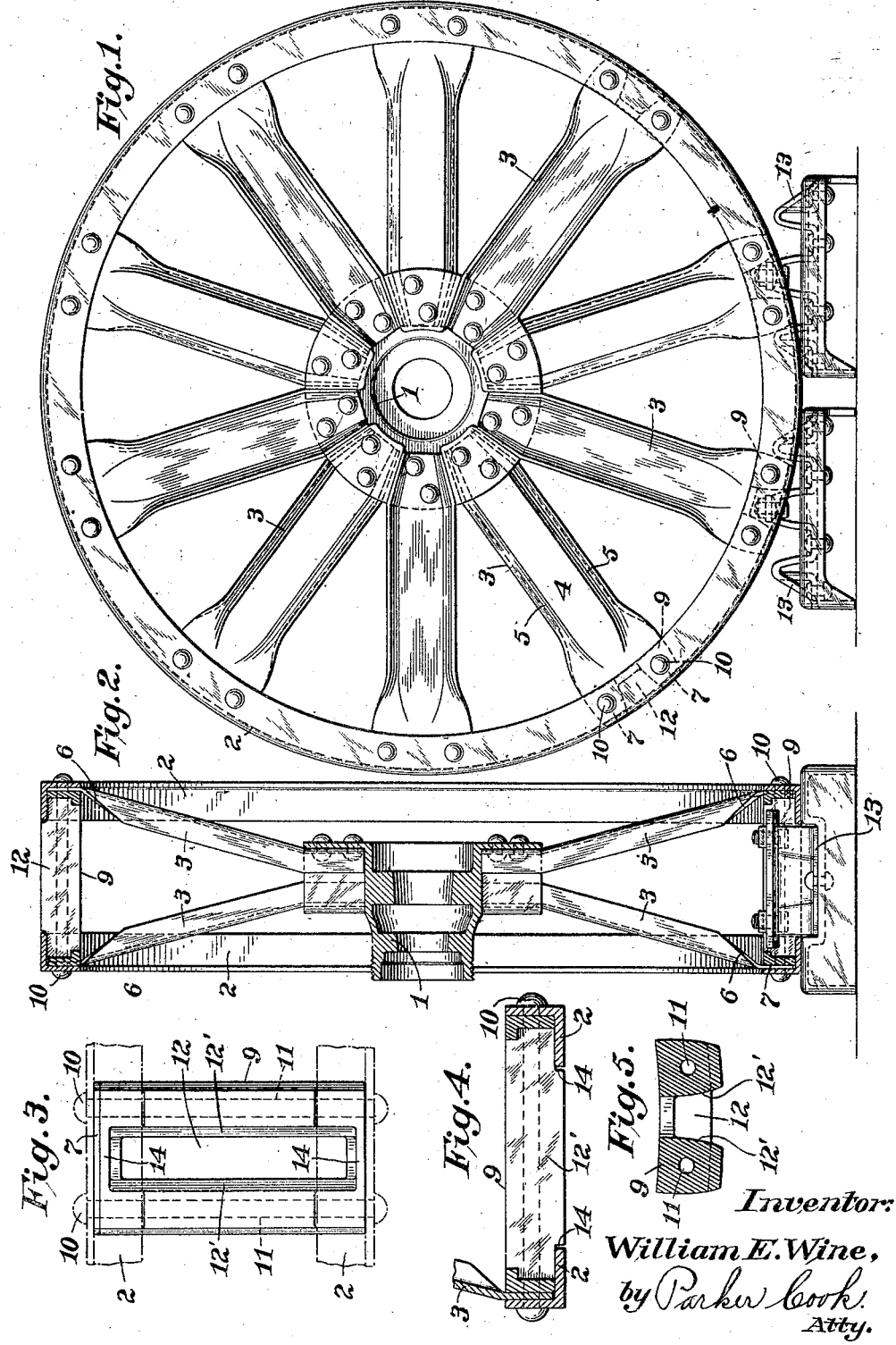

1,586,935

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR WHEEL.

Original application filed August 15, 1925, Serial No. 50,511. Divided and this application filed January 29, 1926. Serial No. 84,596.

My invention relates to new and useful improvements in tractor wheels and more particular to a wheel made up of a hub, a plurality of metal spokes and two bands or rings forming a skeleton rim. In the latter, are secured a plurality of casings or spacer blocks to which in turn are secured the retaining means of the tread members.

The present application is a division of an application filed by me on August 15, 1925 for tractor wheels, bearing Serial Number 50,511.

The present application in its broadest aspect is similar to another divisional application filed by me on Jan. 20, 1926, bearing Serial Number 84,883, the parent case of that application being filed by me on July 11, 1925, Serial No. 42,998.

One of the principal objects of the present application is to construct a wheel having a skeleton rim in which there are located a plurality of casings, the length of the casings being the distance between the two bands forming the rim minus the thickness of the spoke at its end. In other words, between each casing and one band of the rim, is secured a spoke, the spokes appearing on the alternate ends of the plurality of casings.

Still another object of the invention is to provide a tractor wheel consisting of a hub, rim and casings which will be relatively light in weight and rigid in construction and the casings of the wheel not only bracing the wheel throughout, but also providing means for the reception of tractor shoes of different forms.

In the drawings:—

Fig. 1 is a side elevation of my improved tractor wheel, two shoes being shown in place, they forming, however, no part of the present invention.

Fig. 2 is a vertical sectional view showing how the casings are secured to the annuli or skeleton rim.

Fig. 3 is a slightly enlarged detail view of a casing or spacer block.

Fig. 4 is a longitudinal section of the same, and

Fig. 5 is a transverse sectional view thereof.

Referring now more specifically to the several views, it will be seen that the tractor wheel comprises a metal hub 1 and two annuli or rings 2 formed of two angle members, one leg of each member extending towards the other and the other leg of each member extending towards the hub. Riveted to the hub 1 are the plurality of spokes 3, each of which consists of a flat body portion 4 having the side flanges 5 which are bent near their outer ends as at 6, so that the ends 7 will be flat, the ends being fastened to the rings as will be shortly described.

The inner end of each spoke is beveled or wedge-shaped so when all the spokes are riveted to the hub, they will appear as shown in Fig. 1. These spokes are positioned with their faces in the opposite direction while their inner ends are alternately riveted to the opposite sides of the hub. The outer ends of the respective spokes are arranged to be secured first to one ring and then to the other so that the skeleton rim is equally well braced throughout its periphery.

One of the important features in the present invention is the provision of a plurality of casings or spacer blocks which are fitted within the oppositely spaced rings, these casings not only forming the completed rim and bracing the wheel throughout, but furthermore providing a means for the reception of tractor shoes.

These casings 9 are rectangular in form and bolts or rivets 10 are passed through the openings 11 formed in the casings 9, to secure the casings between the several bands 2. These casings or spacer blocks are each provided with a rectangular opening 12, the side walls 12' of these openings being beveled to form a tooth surface to cooperate with a retaining means 13 of a tractor shoe, the tractor shoe and retaining means forming no part of the present invention, but forming the subject matter of the parental application, Serial No. 50,511, of which the present application is a division.

The end walls of these casings are cut out slightly as at 14 so that when they are placed within the bands 2 of the rim, the outer surfaces or edges of the tapered-shape portions of the casings or spacer blocks will lie flush with the outer surface of the rim, or bands of the rim, as may be seen in Fig. 4.

The length of these casings or spacer blocks, is such that there is a space left between the one end of the casing and a band of the rim to receive the respective ends of the spokes 3 as may be seen in Figs. 3 and 4.

When the pair of bolts or rivets 10 are passed through the bands and the casing, they also pass through the ends of a spoke to thereby rigidly secure the rim with respect to the hub and at the same time secure the casing rigidly in position.

These spokes are secured first to the end of one casing and then the next spoke is secured to the alternate end of the next casing, or in other words, a spoke will appear first between a casing and the band on one side of the rim of the wheel and the next spoke between the casing and the other side of the rim of the wheel. This provides a more rigid structure than could be obtained by simply fastening the spokes between the casings and one band of the rim without alternating the arrangement.

From the foregoing it will be seen that I have provided a tractor wheel, relatively light in weight and consisting primarily of a hub, spokes and a skeleton rim in which rim are placed a plurality of casings while between the alternate ends of the casing are fitted the ends of the respective spokes, after which rivets are passed through the ends of the spokes, the casing and the two bands of the rim. The casings, therefore, not only annularly but transversely brace the rims. Furthermore, the casings form means for the reception of tractor shoes and they are so shaped that they provide a tooth-like action with a retaining means of a tread member.

I am aware that it is old to provide a skeleton rim and casing and I do not claim the invention broadly as such, but what I do claim and desire to secure by Letters Patent is:—

1. A tractor wheel comprising a hub, two rings arranged to form a skeleton rim, a plurality of spokes secured to the hub and to the rings, a plurality of casings arranged within said rim and the length of each casing being less than the distance between the rings, an end of a spoke fastened to one end of each casing and interposed between the casing and the adjacent ring to thereby fill up the space between the casing and the ring to rigidly brace the wheel, and means passing through the spokes, rings and casings for holding the parts in their respective positions.

2. A tractor wheel comprising a hub, two annularly arranged members spaced from each other and forming a skeleton rim, spokes extending from the hub to the rim, a plurality of casings fitting within the two spaced members, and the length of each casing being equal to the distance between the spaced members minus the thickness of the end of a spoke, the ends of the several spokes being alternately interposed between the opposite ends of the casings and the adjacent annularly arranged member of the rim and means passing through the members, casings and the ends of the spokes to hold the said parts in a fixed position.

3. A tractor wheel comprising a hub, two annularly arranged members spaced from each other forming a skeleton rim, a plurality of casings fitting within the two spaced members, and the length of the casings being such when inserted in the rim that they each leave a space at one end for the reception of the end of a spoke, and the casings so positioned that the spokes will be alternately interposed between the opposite ends of the succeeding casings and the skeleton rim.

4. A tractor wheel comprising a hub, two annularly arranged angle members forming a skeleton rim, a plurality of casings fitting within each two angular members and being less in length than the distance between the two angular members to thereby leave a small space between one end of the casing and the adjacent angular member, the casings so positioned that this space appears alternately at the opposite ends of the several casings, a plurality of spokes fitting within the hub and having their outer ends fitting within these alternate spaces between the angular members and the casings, and means respectively passing through the casings, skeleton rim and ends of the spokes to thereby secure the parts in their fixed position, and each of said casings having teeth formed thereon.

5. A tractor wheel comprising a hub, two rings arranged to form a skeleton rim, a plurality of spokes secured to the hub and to the rim, a plurality of casings fitting within said rings and the alternate end of each casing contacting with the end of a spoke, each of said casings being cut out at its ends so that the casings will lie flush with the outer surfaces of the rim of the wheel.

6. A tractor wheel comprising a hub, two rings and spokes, said spokes having a body portion and side flanges, rigidly secured to the hub, the said spokes being flattened at their outer ends and secured to the skeleton rim, casings of less width than the distance between the two rings set within the rings, and the alternate ends of the casing contacting with the ends of the spokes, and means passing through both rings, the ends of the respective spokes and the casings for holding the parts in position.

7. A tractor wheel comprising a hub and a plurality of metal spokes, two annuli, said spokes each comprising a body portion and side flanges, the inner ends of the spokes being beveled and riveted to the hub, the outer ends of the spokes being flattened to engage the annuli, a plurality of casings resting within the annuli and each casing positioned opposite the end of a spoke, means passing through the annuli, the respective ends of the spokes and the casings for holding the several parts in position, and each of the casings provided with a central aperture adapted to receive a part of a tractor shoe.

In testimony whereof I affix my signature.

WILLIAM E. WINE.